United States Patent [19]

Grenier

[11] 4,169,668

[45] Oct. 2, 1979

[54] TRANSPARENCY PROJECTOR COMPRISING A PLURALITY OF OPTICAL SYSTEMS

[75] Inventor: Georges E. Grenier, Paris, France

[73] Assignee: Agence Nationale de Valorisation de la Recherche (ANVAR), Neuilly sur Seine, France

[21] Appl. No.: 874,028

[22] Filed: Feb. 1, 1978

[30] Foreign Application Priority Data

Feb. 4, 1977 [FR] France .................................. 77 03113

[51] Int. Cl.$^2$ ........................ G03B 21/14; G03B 23/04
[52] U.S. Cl. ........................................ 353/90; 353/94; 353/103; 353/116
[58] Field of Search ...................... 353/83, 86, 90, 94, 353/103, 116

[56] References Cited

U.S. PATENT DOCUMENTS

| 3,847,472 | 11/1974 | Sobotta | 353/94 |
|---|---|---|---|
| 3,910,696 | 10/1975 | Mulch | 353/116 |

*Primary Examiner*—Steven L. Stephan
*Attorney, Agent, or Firm*—Gifford, Chandler, VanOphem, Sheridan & Sprinkle

[57] ABSTRACT

The present invention relates to a projector comprising two optical systems enabling transparencies to be projected with cross-fading, in 3-D and with double-width panning, said projector operating with a single transparency distributing and recuperating magazine, in which the transparencies are arranged in the same order as if they were to pass in a single-lens projector; said projector comprises four parallel transparency guide slots, which are parallel to one another and transverse with respect to the axes of two optical systems in which the transparencies circulate in pairs, said guide slots being extended by a switching means whose role is to cause the transparencies which have already been projected to pass from the forward guide slots into the return guide slots, and thus to cause the transparencies to return to the same compartment of the same magazine from which they left. These displacements are possible due to a recuperator having multiple functions. Simultaneously to the displacement of the recuperator, a double potentiometer in relation with an electronic device effects cross-fading. This projector may be used for simple projection, but without a gap between two transparencies, for 3-D and for double-width panning.

29 Claims, 15 Drawing Figures

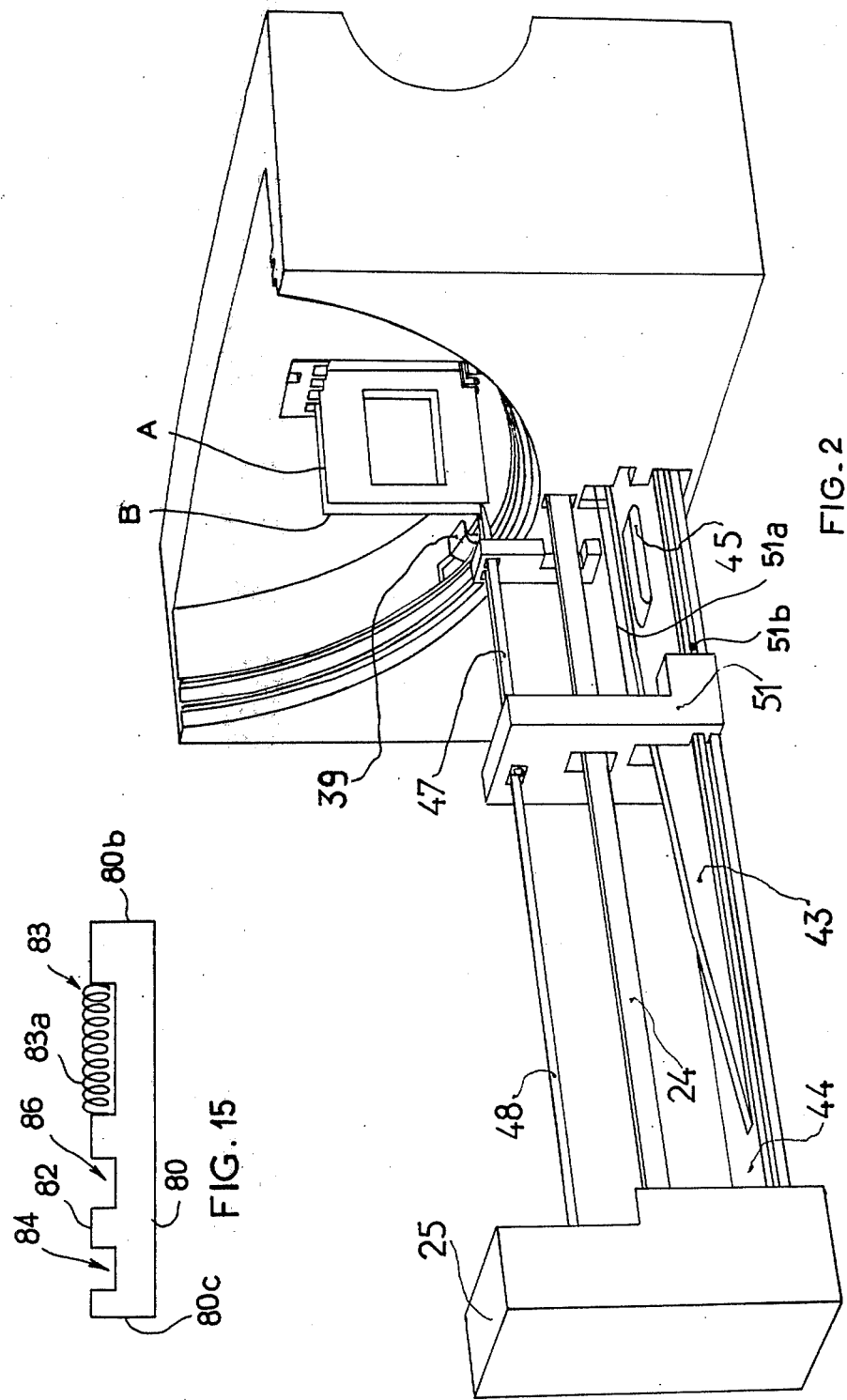

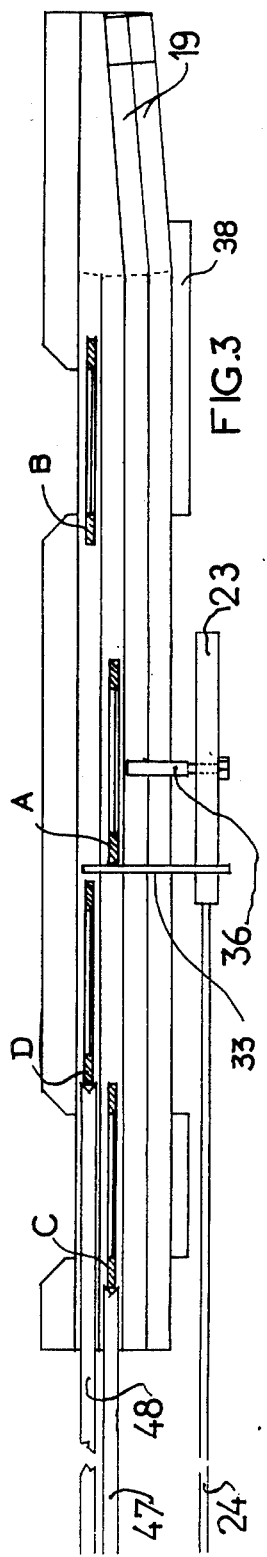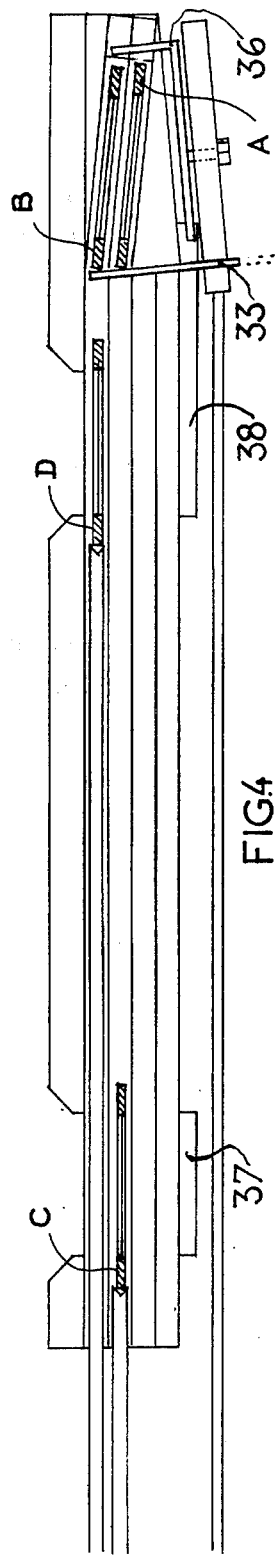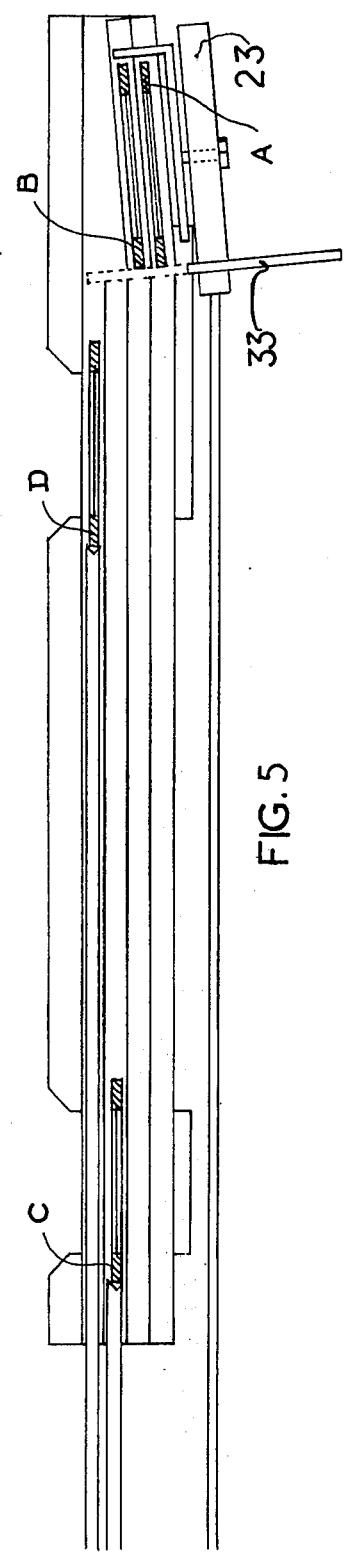

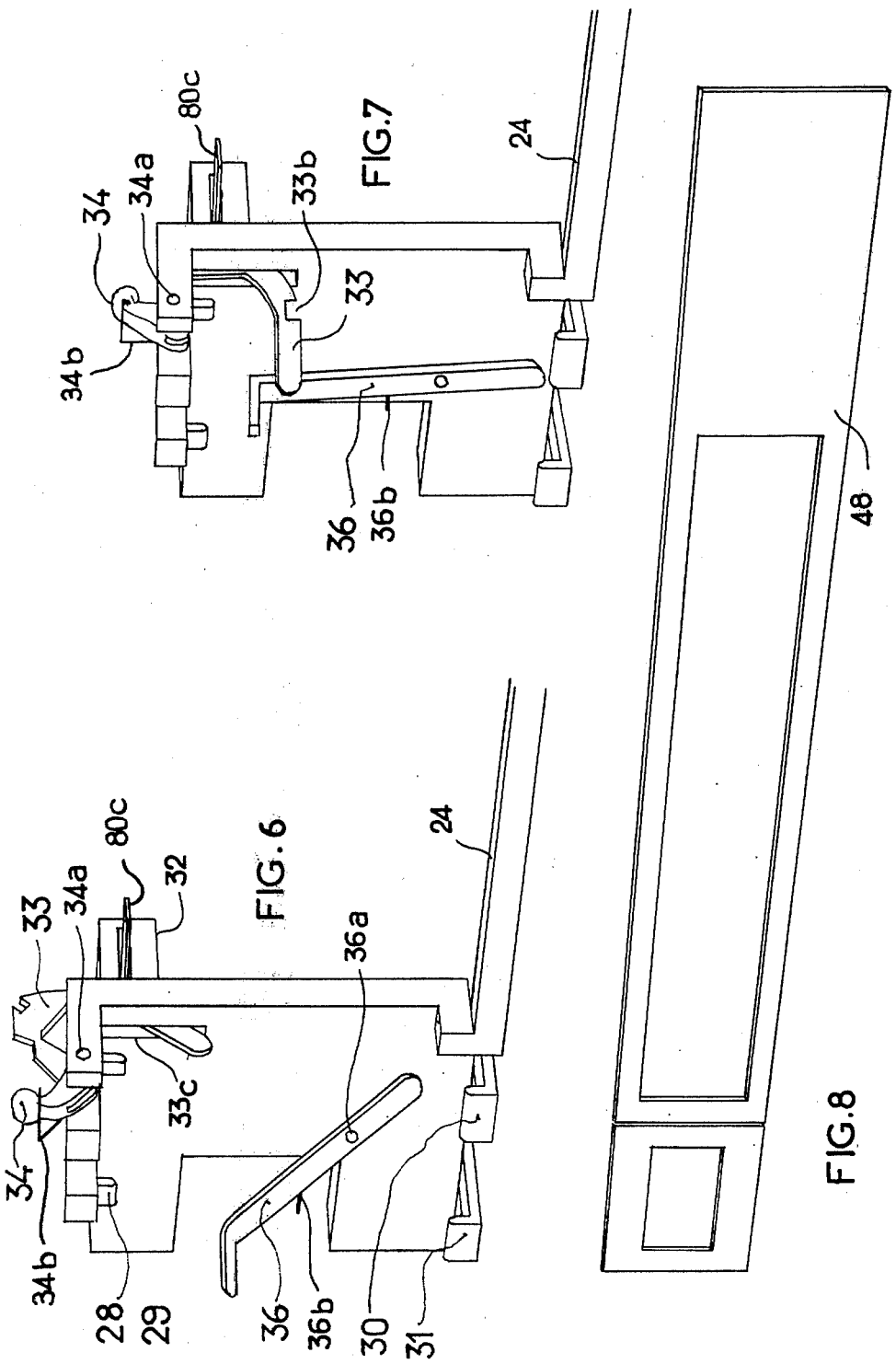

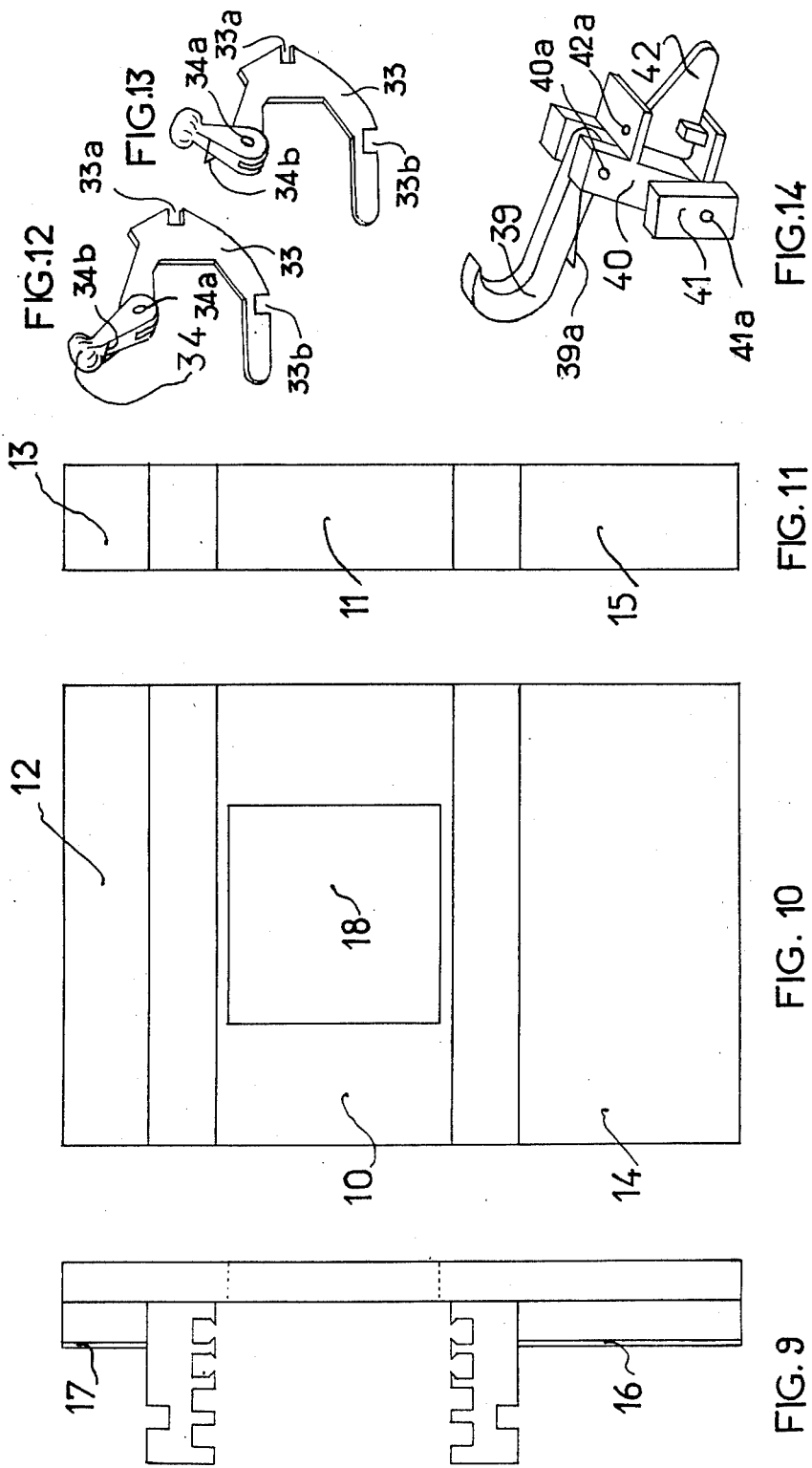

TRANSPARENCY PROJECTOR COMPRISING A PLURALITY OF OPTICAL SYSTEMS

BACKGROUND OF THE INVENTION

The present invention relates to a transparency projector comprising two optical systems placed in parallel in the same casing, as well as two push members causing two transparencies or diapositives to slide simultaneously in two guides transverse with respect to the two optical systems, with a view to making certain special effects.

DESCRIPTION OF THE PRIOR ART

Transparency projectors are known which comprise two optical projection systems avoiding the discontinuity in the projection of the successive transparencies and possibly producing a "cross-fading" effect by progressively projecting two successive transparencies in superimposition, the first growing indistinct whilst the second appears and gradually replaces it completely, a third then appearing progressively, and so on.

The known apparatus comprise a separate supply magazine for each of the projection systems, this rendering them inconvenient to use; in fact, the successive transparencies must be arranged in separate magazines in a precise order. On the other hand, these apparatus must comprise complex automatic mechanisms to ensure the successive supply of the two optical systems and, possibly, the synchronisation of this supply with the control of one or more diaphragms. A projector is also known having a single transparency distributing magazine, but in which the lamp-houses must move in a very complicated manner to allow the transparency to be placed in position.

Finally, Applicant's French Pat. No. 1,467,056 discloses a cross-fading projector which functions with a single magazine located between the two optical systems on which a single lever enables the transparencies to be engaged in each optical system alternately, and enables them to be recuperated in the same order; however, this projector functions with transparencies arranged in a guide without removable magazine.

For different reasons, these apparatus have an extremely high cost price and their distribution is thus limited.

SUMMARY OF THE INVENTION

The present invention proposes to remedy these drawbacks with the aid of a double-lens projector comprising only one removable magazine.

In fact, in said projector, the transparencies are arranged in a magazine as simply as if they were to be projected with a single-lens projector; this projector may cross-fade, or may project with simultaneous and juxtaposed double projection, or it may serve as stereo projector.

To this end, the present invention proposes a transparency projector of the type in which the transparencies are removed from the compartments of a single magazine and are replaced therein in identical manner after projection, said projector comprising at least two juxtaposed optical systems allowing the simultaneous or successive projection of as many transparencies as there are optical systems, each optical system being associated with an advance conveyance channel and a return conveyance channel allowing the movement of the transparencies by a drive assembly between their respective compartment and projection window. The projector according to the invention is characterised in that the conveyance channels are in the form of guide slots transverse with respect to the optical axes, transfer means located opposite the magazine with respect to the optical systems allow the simultaneous transfer of the transparencies from the advance guide slots to the return guide slots so that each transparency, under the effect of the drive assembly, effects a forward movement and a return movement in the course of which it moves twice in front of the projection window of each optical system.

According to a preferred embodiment having two optical systems, two transparencies are pushed simultaneously and horizontally by two push members in the two guide slots of the series of the four parallel vertical guide slots which are transverse with respect to the optical axes.

This series of guide slots is located at the spot where all the other projectors possess only one guide slot, i.e. between the lamp-houses and the lenses.

These guide slots are formed of lower and upper grooves placed so that they allow the light coming from the lamp-houses to pass through the two projection windows.

These guide slots formed by grooves do not have a wall on the lens side, this enabling a recuperator member to function and the transparencies to be returned after projection into the same compartment of the same magazine from which they left.

The single magazine may be straight or rotary, it may be especially designed or chosen from those most used in projection.

The two push members act on the transparencies simultaneously either at the base, at the top or over the whole height thereof.

The lower or upper push members are of suitable shape in order not to escape from the corresponding groove, for example their section is that of a truncated pyramid, the grooves having a complementary section.

If push members are preferred which act over the whole height of the transparencies, the longest must be open at its centre, to allow passage of the light coming from the first optical system through this push member, whilst said push member continues its stroke to effect the change of transparency in the second optical systems.

This large open push member may be solid, but made of transparent matter.

This large push member is fast with a single lever and a control system having multiple functions.

By causing the control system to penetrate via the lever, two push members cause two transparencies to slide simultaneously.

The small push member is of sufficient length to place the first transparency in front of the projection window of the first optical system; having terminated its stroke, this small push member, controlled by the control system but via guide support, enables said control system to continue its path, driving the large push member to a sufficient distance to place the second transparency in front of the projection window of the second optical system (a spring pulls the small push member to the inside).

A transparency recuperator extended by a rod is fast with the single lever.

The control system is provided with an inclined plane to cause the magazine to rotate or advance (according to whether it is straight or rotary) via a device which will be described hereinbelow.

Finally, the control system possesses a horizontal surface which causes the control knob of a double potentiometer in connection with an electronic device which is already known and which ensures the crossfading, to rotate.

In another embodiment of the invention, a projector may be provided having more than two optical systems; to this end, it suffices to add to the series of the four guide slots, two guide slots per complementary optical system, as well as a push member provided with its guide support, and a switching path.

The invention will be more readily understood on reading the following description with reference to the accompanying drawings, in which:

BRIEF DESCRIPTION OF THE DRAWINGS

FIG. 2 is a front view in perspective of the transparency supply system.

FIGS. 3, 4 and 5 are transverse sections.

FIGS. 6 and 7 are rear views in perspective of the system for recuperating the transparencies.

FIG. 8 is a rear view in perspective of a push member pushing a transparency over its whole height.

FIG. 9 is a view of the section of the transparency guide slots.

FIG. 10 is a front view of an element forming the guide slots and comprising a projection window.

FIG. 11 is a front view of an intermediate element forming the guide slot.

FIGS. 12 and 13 show the push member for recuperating the transparencies at two different moments of the operation.

FIG. 14 shows the device for advancing the rotary magazine.

FIG. 15 shows in detail the lock member of the system for recuperating the transparencies.

DESCRIPTION OF THE PREFERRED EMBODIMENT

Figure 1:
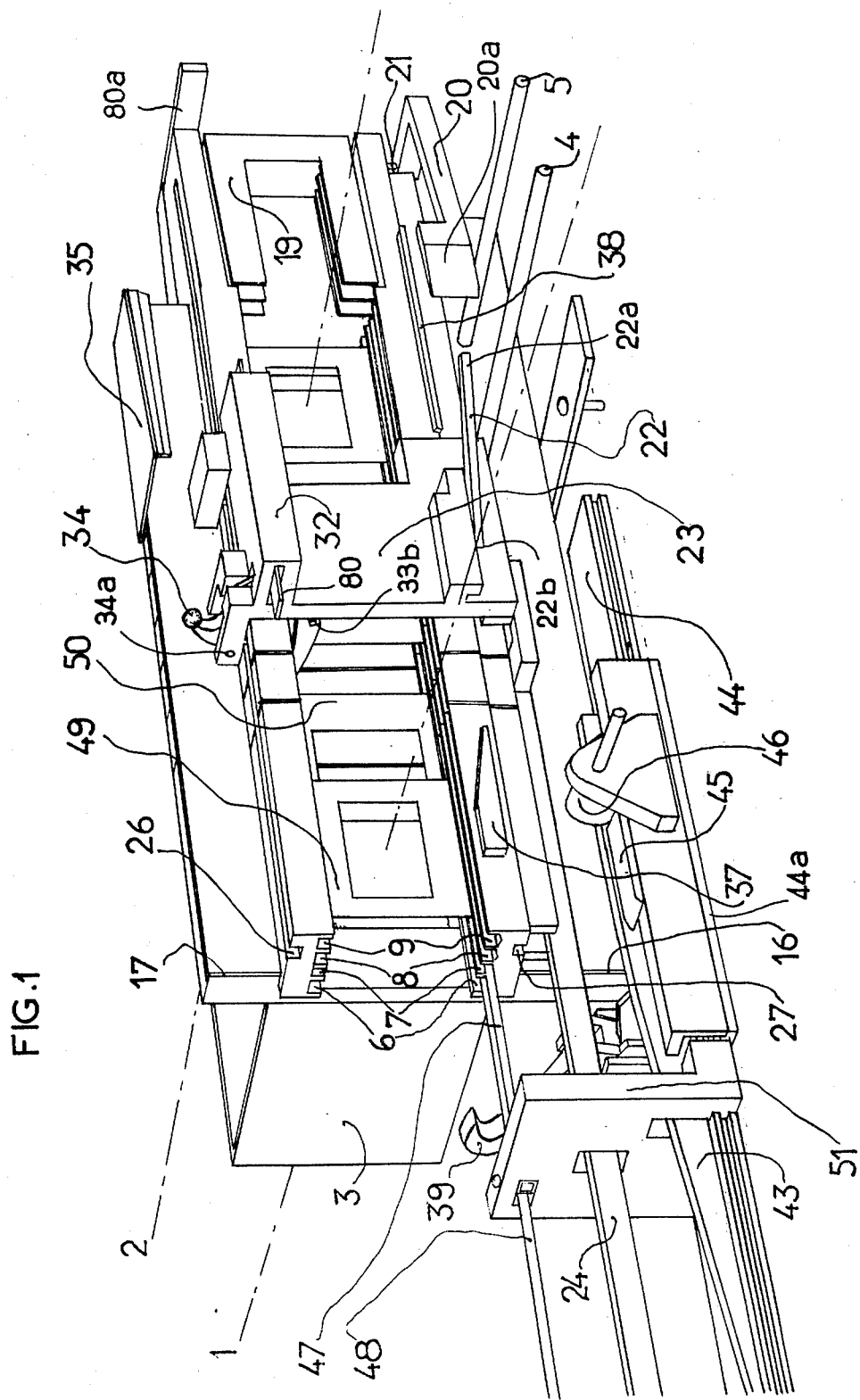
FIG. 1 is a front view in perspective of the main parts of a projector according to the invention. Other members have not been shown, in order to render the drawing more clear.

Referring now the the drawings, FIG. 1 shows a projector on which appear the axes of the optical systems 1 and 2 (in dashed and dotted lines). Only the lamp-house 3 of the first optical system is visible. The two support rods 4 and 5 of the lens-holder of the second optical system are also visible (the two support rods of the first optical system not being shown in the drawing for greater clarity thereof).

Each of the optical systems 1 and 2 conventionally comprises a source of light, a parabolic mirror, a condenser and a lens. These elements are known, do not form part of the invention and are therefore not shown. The same applies to the transformer, the fan and all other known accessories necessary for setting up an improved projector.

The series of four parallel, vertical guide slots 6, 7, 8 and 9, which are transverse with respect to the optical axes 1 and 2, is composed of upper and lower grooves thus forming four transparency guides.

This series of guide slots is constituted by vertical elements 10 and 11, of which the parts higher than the upper grooves 12 and 13 and lower than the lower grooves 14 and 15 are fixed on steel strips 16 and 17 (FIGS. 9, 10, 11).

Two of these elements 10 placed at the ends comprise the projection windows 18; they are connected together by a plurality of intermediate elements 11 having the same section, but less wide and together form the transparency guides.

In extension of the guide slots there is placed a double switching means 19, the role of which is to cause two transparencies which have already been projected to pass at the same time from rear guide slots 6 and 7 to front guide slots 8 and 9.

This double switching means is mounted to pivot about a vertical axis 21 on which is mounted a small return spring (not shown) returning the switching means to its normal front position opposite guide slots 8 and 9. An index 20, fast with the switching means 19, comprises a cam 20a which is urged by an index 22 projecting laterally from the recuperator 23. This index 22, mounted to pivot about a vertical axis (not shown) is subjected to a spring (not shown) which tends to separate from the recuperator the end 22a of the index whilst the other end 22b comes into abutment against the recuperator 23. When the end 22a comes into contact by the front of the cam 20a, the switching means 19 rotates towards the guide slots 6 and 7, whilst the cam 20a slides along the index 22 in the course of the movement of the recuperator 23. The cam 20a then passes behind the pivoting axis of the index, along the recuperator, and separates the end 22b before being released at the moment when said end 22b arriving at the end of stroke of the upper part of the cam 20a again comes into contact with the recuperator. At this instant, the index 20 and the switching means 19, under the effect of the return spring of axis 21, are returned into the normal front position opposite the guide slots 8 and 9.

The recuperator is connected by a rod 24 to the single lever 25. Grooves 26 and 27 externally opposite the grooves forming the transparency guides, allow the displacement of the recuperator provided with its runners 28, 29, 30 and 31 at the same time as that of the lever (FIG. 6).

The recuperator further comprises a double-stop lock member 32 provided with a flat locking blade 80 (FIG. 15) provided with two recesses 84 and 86 surrounding a locking tooth 82, as well as a spring housing 83 in which is mounted a return spring 83a cooperating with the casing 32 for returning the blade 80 into locking position. This blade cooperates with a crescent-shaped piece 33 comprising two notches 33a and 33b, said piece being mounted to rotate about a horizontal axis 34a of the recuperator (FIGS. 6,7). A spherical headed setting piece 34 is also mounted on the axis 34a whilst a spring 34b urges the two pieces 34 and 33 towards each other (FIGS. 12, 13). The tooth 82 is normally located on the passage of the piece 33 in the slot 33c of the recuperator (FIG. 6). At the end of the advance stroke of the recuperator, the tooth 82 is located in the notch 33a and the piece 33, locked, pushes the transparencies which have already been projected. Under the effect of the inclined plane 35, the setting piece 34 is pulled rearwardly. When the blade 80 enters into contact with the stop piece 80a, by its end 80b, the tooth 82 releases the notch 33a and the spring 34b urges the piece 33 upwardly, the second notch 33b coming opposite the recess 86 of the blade 80. As soon as the recuperator returns towards the magazine, the tooth 82 comes into the notch 33b under the effect of the spring 83a and locks the crescent shaped piece 33 whilst the setting piece 34 is released when it leaves the inclined plane 35. On the contrary, when the lever is pulled to the end of return stroke, the blade 80 enters into abutment on the other side by its end 80c and the crescent-shaped piece is released by simple gravity and takes its lower position, whilst its notch 33a which is located opposite the recess 84 is then reblocked, at the beginning of advance stroke, by the tooth 82, upon the release of the lock member subjected to spring 83a.

The recuperator 23 further comprises a bent piece 36 which recuperates the transparencies from the double switching means 19, as soon as the latter has pivoted and is located opposite the return grooves 8 and 9.

This bent piece 36 is mobile, mounted on an axis 36a which enables it to make a half-revolution during the displacement of the recuperator 23.

A spring 36b mounted on the axis 36a maintains it normally vertical whilst the inclined planes 37 and 38 placed in front of the external lower groove and under the projection windows cause it to tip, thus contributing a complementary stroke necessary for this part of the recuperator to return the transparencies into the magazine, the inclined plane 37 causing the bent piece 36 to tip towards the magazine so that the transparencies precede the recuperator in its return stroke towards the magazine and the transparencies may thus be returned to their compartments.

The device for advancing the magazine is a hook 39 mounted with a spring 39a on the axis 40a of a lever arm 40 itself centred on a support 41 fixed on the same base as the guide of the control system 44a. This lever arm 40 remains normally forwardly inclined, held by a spring (not shown) mounted on axis 41a. A feeler 42 centered vertically on the arm of the lever causes said lever to tip backwards under the pressure of the inclined plane 43 produced by the displacement of the control system 44 towards the outside. When the control system is completely pulled, the feeler will fall beyond the inclined plane under the effect of the spring already mentioned, at the same time driving the hook which will itself cause the magazine to move by two compartments. This feeler is returned by a spring (not shown) mounted on its axis of rotation 42a.

Of course, there are provided on a ring outside the rotary magazine used in this projector, lugs which cooperate with the hook described previously to cause the magazine to advance by two compartments at each cycle of functioning of the projector. These lugs are lower in number by half than the number of compartments contained in the rotary magazine.

A horizontal surface element 45 is fixed on the front face of the inclined plane, of sufficient length to cause the control knob 46 of a double potentiometer (not shown) in connection with an already known electronic device which ensures cross-fading, to function.

By causing the control system 44 to penetrate via the lever 25, two push members 47 and 48 simultaneously actuate two transparencies 49 and 50 (FIG. 1).

The small push member 47 is of sufficient length to place the first transparency in front of the projection window of the first optical system 1. It is controlled by the control system 44 via a guide support 51 urged towards the inside of the projector by a return spring 51a (FIG. 2) whilst a stop 51b of the control system enables it to be pulled towards the outside due to the lever 25. Said support 51, when it is in abutment against the projector, thus allows the control system to continue towards the inside, which control system drives the large push member 48 to a sufficient distance to place the second transparency in front of the projection window of the second optical system.

The projector operates as follows:

The lever is firstly pulled, then the rotary magazine is placed in its cradle, and more precisely the transparency A opposite the start mark, or opposite the second groove starting from the rear of the projector. The lever is pushed and the first two transparencies A and B penetrate in the projector, pushed by the push members.

The transparency A, pushed by the small push member, stops in front of the optical system 1 whilst transparency B, pushed by the large push member, continues its path and stops in front of the optical system 2. At this moment, the projector is lit and the transparency A is projected. The lever is pulled and the recuperator which, this time, returns empty, passes in front of the optical system 2 whilst it is extinguished.

On continuing its stroke, the lever drives the control system of which the horizontal part 45 comes into contact with the knob 46 of the double potentiometer and the cross-fading is effected (the light of the optical system 1 reduces in intensity, then is extinguished completely whilst the lamp of optical system 2 has progressively reached its full intensity). The lever continues to be pulled and the recuperator is now brought in front of the optical system 1 without damage for the projection. During this end of path, the feeler 42 has mounted the inclined plane then at the end thereof, it falls again, thus causing the magazine to advance by two compartments via its ring provided with lugs, and via the hook 39. The lever will be pushed again, and the push member 47, 48 which have returned to their starting position will push two other transparencies C and D, the crescent-shaped piece 33 of the recuperator will precede them by pushing the transparencies A and B which have already been projected. The new transparencies C and D, pushed by their push members, penetrate in the projector, transparency C pushed by the small push member 47 stops in front of the optical system 1. Whilst the transparency D pushed by the large push member 48 continues its stroke, the lever 25 drives the control system 44 of which the horizontal part comes into contact with the knob of the double potentiometer and the cross-fading is effected this time in the reverse direction (therefore the optical system 2 being extinguished progressively whilst the light intensity of the optical system 1 is amplified). The lever may be actuated manually or automatically by drive means.

The recuperator 23 pushes the transparency B which has already been projected followed by the large push member which brings the fourth transparency D.

Before arriving at the end of its stroke, the recuperator via the guide 20 has placed the double switching means in position to take charge of the transparencies A and B which have already been projected; on arriving at the end of its path, the crescent-shaped piece 33 which pushed the transparencies is released by the lock member functioning in two directions and pivots with respect to the vertical.

The guide 20 having terminated its function, the released double switching means is now opposite the two front guide slots, and the bent piece 36 of the recuperator is inclined under the effect of the inclined plane 38 to push the transparencies towards the two compartments of the magazine from which they left.

During the path, the cross-fading will be produced as previously and before arriving at the end of the path, the bent piece will cause the transparencies to accelerate and they thus return into their compartments and all the other operations start again.

What I claim is:

1. A transparency projector having optical axes through projection windows in which the transparencies are removed from the compartments of a single magazine and are replaced therein in identical manner after projection, said projector comprising at least two juxtaposed optical systems allowing the simultaneous or successive projection of as many transparencies as there are optical systems, each optical system being associated with an advance conveyance channel and a return conveyance channel, a drive assembly moving the transparencies in the respective advance conveyance and return conveyance channel between their respective compartment and projection window, wherein the conveyance channels are in the form of guide slots transverse with respect to the optical axes, and transfer means located opposite the magazine with respect to the optical systems for the simultaneous transfer of the transparencies from the advance guide slots to the return guide slots so that each transparency, under the effect of the drive assembly, effects a forward movement and a return movement in the course of which it moves twice in the front of the projection window in each optical system.

2. A projector as claimed in claim 1, wherein the drive assembly comprises as many push members of different length as there are optical systems so as to cause the transparencies to penetrate simultaneously in the projector and to bring each transparency in front of the corresponding window of its optical system, during the forward movement.

3. A projector as claimed in one of claim 1 wherein the drive assembly comprises a recuperator which brings the projected transparencies to the transfer means before returning them to the return guide slots.

4. A projector as claimed in one of claims 2 or 3, wherein the drive assembly comprises a control member which controls the smaller push member and the possible intermediate ones by guide supports subjected to return means directed towards the inside of the projector and to stops of the control member pulling them towards the outside during the return movement of the maneuvering assembly, the large push member being fast with the control member.

5. A projector as claimed in claim 4, wherein the push members, which must not hinder the projection of the transparencies, are constituted by supple rods located in the lower or upper part of the transparencies, said rods being guided in the lower or upper guides of the forward guide slots, which present a transverse section corresponding to that of the rods.

6. A projector as claimed in claim 4, wherein the push members act over the whole height of the transparencies and are open at their center to allow the light of the optical systems to pass or are constituted by a transparent matter.

7. A projector as claimed in claim 4, wherein the recuperator comprises a double stop lock member co-operating, at the end of stroke, with a crescent-shaped piece provided with two locking notches and mobile transversely with respect to the guide slots, said piece being mounted elastically with a setting piece urged by a fixed inclined plane so that, once released on arriving on the magazine side, the crescent piece may push the transparencies projected so as to bring them to the transfer means.

8. A projector as claimd in claim 7, wherein the recuperator further comprises a vertical bent piece mounted elastically and urged by a first inclined plane which inclines it towards the transfer means so as to return the transparencies and a second inclined plane which inclines it towards the magazine so as to provide the complementary stroke necessary for placing the transparencies back in the magazine.

9. A projector as claimed in claim 8, wherein the transfer means are constituted by a switching means elastically mounted on a vertical axis, said switching means being directed, in normal position, towards the return guide slots.

10. A projector as claimed in claim 9, wherein the switching means comprises a guide urged then released by an index mounted for elastic rotation on the carriage when said latter arrives at the end of forward stroke so that the switching means effects a rotation towards the forward guide slots in order to receive the projected transparencies before returning to normal position.

11. A projector as claimed in claim 10, wherein the control system presents a plate intended to cooperate with the maneuvering knob of a potentiometer allowing a cross-fading effect.

12. A projector as claimed in claim 11, wherein the control system further comprises an inclined plane intended to actuate means for advancing the magazine when the transparencies in number equal to that of the optical assemblies have returned to their compartments.

13. A projector as claimed in claim 12, wherein the advance means are constituted by a hook elastically articulated on a lever arm, said lever arm being released and set due to a feeler by the inclined plane of the control system to cooperate with notches in the magazine.

14. A projector as claimed in claim 13, wherein the notches are spaced out so that the magazine advances by a number of compartments equivalent to that of the optical systems.

15. A projector as claimed in claim 14, wherein the guide slots are made by the grooves of separate elements cooperating with larger elements comprising the projection windows, said elements being assembled on two steel strips transverse with respect to the optical axes and vertical, one above, one below the projection windows.

16. Transparency projector of the type in which the transparencies are removed from the compartments of a single magazine and are replaced therein in identical manner after projection, said projector comprising
(a) at least two juxtaposed optical systems, each provided with a projection window, for the simultaneous or successive projection of as many transparencies as there are optical systems, each optical system being associated with an advance conveyance channel and a return conveyance channel in which the transparencies are guided;
(b) a movable drive assembly including
a recuperator,
a control member and
as many push members of different length as there are optical systems, said push members being responsive to the control member and capable of relative movement one with respect to the others;

(c) transfer means located opposite the magazine with respect to the optical system, said conveyance channels joining the magazine to said transfer means and being transverse to the optical axis of the optical systems, so that, during the forward movement of the assembly, the transparencies are simultaneously pushed from the magazine to be successively brought along the advance conveyance channels to their respective projection position located in front of the projection windows by the different push members while the recuperator brings the projected transparencies to the transfer means for operating the simultaneous transfer of these transparencies to the return conveyance channels, and, during the return movement of the assembly, said projected transparencies are pushed back by the recuperator to their respective compartment of the magazine and advance the magazine is controlled by the control member.

17. A projector as claimed in claim 16, wherein the conveyance channels are in the form of guide slots.

18. A projector as claimed in claim 17, wherein the control member controls the smaller push member and the possible intermediate ones by guide supports subjected to return means directed towards the inside of the projector and to stops of the control member pulling said supports towards the outside during the return movement of the maneuvering assembly, the large push member being fast with the control member.

19. A projector as claimed in claim 18, wherein the push members, which must not hinder the projection of the transparencies, are constituted by supple rods located in the lower or upper part of the transparencies, said rods being guided in the lower or upper guides of the forward guide slots, which present a transverse section corresponding to that of the rods.

20. A projector as claimed in claim 18, wherein the push members act over the whole height of the transparencies and are open at their center to allow the light of the optical systems to pass or are constituted by a transparent matter.

21. A projector as claimed in claim 18, wherein the recuperator comprises a double stop lock member cooperating, at the end of stroke, with a cresent-shaped piece provided with two locking notches and mobile transversely with respect to the guide slots, said piece being mounted elastically with a setting piece urged by a fixed inclined plane so that, once released on arriving on the magazine side, the cresent piece may push the transparencies projected so as to bring them to the transfer means.

22. A projector as claimed in claim 21, wherein the recuperator comprised a vertical bent piece mounted elastically and urged by a first inclined plane which inclines it towards the transfer means so as to return the transparencies and a second inclined plane which inclines it towards the magazine so as to provide the complementary stroke necessary for placing the transparencies back in the magazine.

23. A projector as claimed in claim 22, wherein the transfer means are constituted by a switching means elastically mounted on a vertical axis, said switching means being directed, in normal position, towards the return guide slots.

24. A projector as claimed in claim 23, wherein the switching means comprises a guide urged then released by an index mounted for elastic rotation on the carriage when said latter arrives at the end of forward stroke so that the switching means effects a rotation towards the forward guide slots in order to receive the projected transparencies before returning to normal position.

25. A projector as claimed in claim 24, wherein the control system presents a plate intended to cooperate with the maneuvering knob of a potentiometer allowing a cross-fading effect.

26. A projector as claimed in claim 25, wherein the control system comprises an inclined plane intended to actuate means for advancing the magazine when the transparencies in number equal to that of the optical assemblies have returned to their compartments.

27. A projector as claimed in claim 26, wherein the advance means are constituted by a hook elastically articulated on a lever arm, said lever arm being released and set due to a feeler by the inclined plane of the control system to cooperate with notches in the magazine.

28. A projector as claimed in claim 27, wherein the notches are spaced out so that the magazine advances by a number of compartments equivalent to that of the optical systems.

29. A projector as claimed in claim 28, wherein the guide slots are made by the grooves of separate elements cooperating with larger elements comprising the projection windows, said elements being assembled on two steel strips transverse with respect to the optical axes and vertical, one above, one below the projection windows.

* * * * *

UNITED STATES PATENT AND TRADEMARK OFFICE
CERTIFICATE OF CORRECTION

PATENT NO. : 4,169,668
DATED : October 2, 1979
INVENTOR(S) : Georges E. Grenier

It is certified that error appears in the above-identified patent and that said Letters Patent are hereby corrected as shown below:

```
Column 1 after "BACKGROUND OF THE INVENTION" insert
   --Field of the Invention--;
Column 2, line 17, after "two" insert --rear--;
Column 7, line 39, delete "one of".
```

Signed and Sealed this

Eighth Day of January 1980

[SEAL]

*Attest:*

SIDNEY A. DIAMOND

*Attesting Officer*     *Commissioner of Patents and Trademarks*